United States Patent
Barth

(10) Patent No.: US 7,206,834 B1
(45) Date of Patent: Apr. 17, 2007

(54) INDUSTRIAL CONTROLLER FOR MACHINE TOOLS, ROBOTS AND/OR PRODUCTION MACHINES

(75) Inventor: Rainer Barth, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1200 days.

(21) Appl. No.: 09/664,948

(22) Filed: Sep. 19, 2000

(30) Foreign Application Priority Data

Dec. 22, 1999 (DE) ................................ 199 62 230

(51) Int. Cl.
*G06F 15/173* (2006.01)
(52) U.S. Cl. ...................... 709/224; 709/223; 455/420; 370/466; 340/3.1
(58) Field of Classification Search ................ 709/217, 709/218, 223–225, 206, 207; 455/420; 700/12; 713/502; 370/466; 340/3.1
See application file for complete search history.

(56) References Cited

U.S. PATENT DOCUMENTS

| | | | | |
|---|---|---|---|---|
| 6,065,136 A * | 5/2000 | Kuwabara | ..................... | 714/31 |
| 6,147,601 A * | 11/2000 | Sandelman et al. | ......... | 340/506 |
| 6,185,606 B1 * | 2/2001 | Bereiter | ...................... | 709/206 |
| 6,332,110 B1 * | 12/2001 | Wolfe | ........................... | 702/22 |
| 6,477,667 B1 * | 11/2002 | Levi et al. | .................... | 714/57 |
| 6,536,029 B1 * | 3/2003 | Boggs et al. | ................. | 716/17 |
| 6,591,296 B1 * | 7/2003 | Ghanime | ..................... | 709/224 |
| 6,681,110 B1 * | 1/2004 | Crookham et al. | ......... | 455/420 |

OTHER PUBLICATIONS

Hans B. Kief, "NC/CNC Handbuch" 1995/96, Carl Hanser Verlag, Munich, Vienna, p. 58.
Special Tooling Jun. 1999, "Hier spricht ihre Steuerung", p. 60.

* cited by examiner

*Primary Examiner*—Jeffrey Pwu
(74) *Attorney, Agent, or Firm*—Kenyon & Kenyon LLP

(57) ABSTRACT

When alarms and/or messages are present in the environment of an industrial controller, SMS messages and/or e-mails are used to send all the relevant information to a predefinable group of receivers. The selection of the information and of the group of receivers may be configured in a converter. This allows optimum service to be provided even by physically remote personnel.

11 Claims, 1 Drawing Sheet

INDUSTRIAL CONTROLLER FOR MACHINE TOOLS, ROBOTS AND/OR PRODUCTION MACHINES

FIELD OF THE INVENTION

The present invention relates to industrial controllers for machine tools, robots and/or production machines, in which devices are provided for registering alarms and/or messages for predefinable operating states.

BACKGROUND INFORMATION

Modern numerical controllers contain diagnostic modules, i.e., permanent or specially activatable monitoring functions for machine and control responses for the purpose of automatically documenting and displaying alarms, messages about operating states and the causes thereof. To this end, the numerical controller's display device can show an image of the relevant measured values as a curve, a graph and the like, or the diagnostic results can of course be displayed alphanumerically. Alternatively, such data can be output via interfaces, which allows remote diagnosis (see, e.g., Hans B. Kief "NC/CNC Handbuch" 1995/96, Carl Hanser Verlag, Munich, Vienna, page 58).

It is also convention to forward reportable operating states in the context of programmable logic controllers. In this case, previously defined alerting and escalation strategies can be used to call a predefined group of persons automatically and to inform this group of persons about the necessary actions to be taken, using textual displays and voice announcements (see, e.g., Special tooling 6/99, page 60 ff. "Hier spricht ihre Steuerung").

In both cases, however, simple configuration of which receivers are to be informed about alarms and/or messages to which depth of information is neither known nor disclosed.

SUMMARY

An object of the present invention is to provide an industrial controller so that information having optimum correspondence to the respective alarm or to the respective message can be allocated for maintenance and operating personnel.

According to the present invention, predefined operating states are allocated on an individual basis by means of a converter, to the effect that, if these operating states are present, an SMS message and/or an e-mail about the respective operating state is sent to a predefined distribution group.

By virtue of the feature that the e-mails can, if required, have files, particularly trace files, attached to them, an operating sequence (as an example) immediately preceding the message or the alarm can be documented in detail and communicated to the person who is to be informed.

According to a further example embodiment of the present invention, the allocation is effected by editing using an operating keyboard on the controller. This allows separate programming aids to be dispensed with.

By virtue of the feature that the converter, in addition to the predefinable operating states, can use a bit poll to trigger a respective alarm and/or message for a specific operating state, further operating states can also be configured as reportable, and these further operating states therefore do not need to be part of the predefinable operating states.

To the extent that, when the predefined or specific operating states arise, an SMS message and/or an e-mail about the respective operating state is sent to a predefined distribution group, an immediate response from the message mechanism is ensured and it is possible to dispense with continuous cyclical polling.

The present invention thus allows rapid, comprehensive and exact information by means of alarms and operating messages to the various sites in a company operating the machine, or to firms providing services (including machine manufacturers). The procedure to date, where faults, equipment shutdowns, etc., are passed on, usually orally, from the worker to the supervisor and so on until, finally, a hotline or a service provider is reached, can thus be bypassed, so that it is no longer the case that, as previously, information is lost or queries regarding a machine, a software level, the location of the machine, data relating to faults, such as trace files, etc. are necessary. The present invention thus allows the aforementioned data to be sent quickly and in the simplest of manners by e-mail to any desired e-mail receiver using the Internet. This means that it is also possible to inform a hotline at any site in the world about this fault or message, irrespective of time. Furthermore, it also allows a plurality of receivers to be defined, these receivers thus immediately having the same level of information as each other. Depending on the relevant alarms or the relevant message, the reaction can then be of various type and manner.

DETAILED DESCRIPTION

Figure 1:
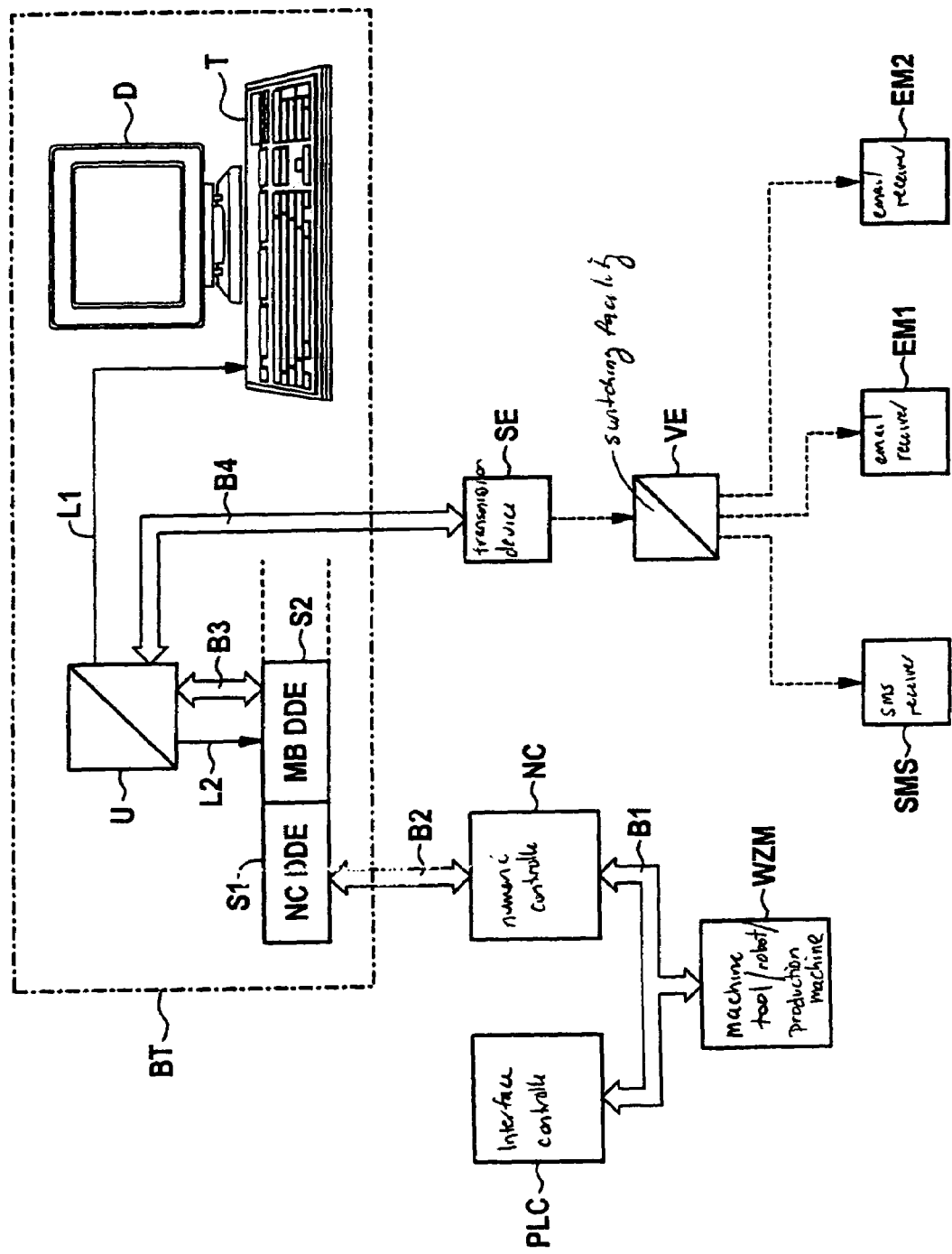
FIG. 1 shows an example embodiment of the present invention.

FIG. 1 shows a block diagram of a machine tool WZM whose operation is controlled by a numerical controller NC which, in turn, has an interface controller PLC alongside it. Data is interchanged between the numerical controller NC, the interface controller PLC and the machine tool WZM via a bus system B1. The numerical controller NC also includes a control panel BT, which is connected to the numerical controller NC via a bus system B2. The control panel BT has an associated display D for showing the desired or actual operation of the machine tool WZM. In addition, a keyboard T for an operator to input data is also provided on the control panel BT.

Included in the operating system of the numerical controller is a series of servers, server S1 and S2, which are allocated to the control panel BT in the illustrative embodiment. In this arrangement, the server S1 can know all the NC variables and PLC variables and parameters, as indicated by the label NCDDE. The server S2 can be regarded as an alarm server, which is indicated by the label MBDDE. Further servers are shown only in dashed lines.

According to the present invention, a converter U, whether designed using hardware or software, can access the server S2 via a bus system B3 and thus always reacts when the alarm server S2 contains a state in the numerical controller NC, in the interface controller PLC or in the machine tool WZM as an alarm or occurrence of a message. The converter U uses a table function, which is stored in it, to define which alarm or which message is allocated, which may include:

1. list of persons or sites to be informed, 2. relevant short information as e-mail, possibly limited to SMS format, and 3. further files, to be attached to an e-mail.

When this allocation has taken place, a bus system B4 is used to activate a transmission device SE, for example a modem, as an e-mail client, and the receivers, be they pure SMS receivers, which can process only 160 characters, or be they normal e-mail receivers EM1 and EM2, for example PCs, receive the sent information via a switching facility VE used as an e-mail server. The relevant information stream is indicated in dashed lines in this case.

The allocation function of the converter U can, as indicated by a line L1, be configured by the user, using the keyboard T on the control panel BT.

If the number of alarms and/or messages usually present in the server S2 is insufficient and very specific further operating states of the numerical controller NC, the interface controller PLC and/or the machine tool WZM need to be polled, the converter U and a line L2 can be used, in this context, to initiate a bit poll, i.e., the system is informed of those predefined states of the numerical controller NC, the interface controller PLC and the machine tool WZM for which a relevant operating state is subsequently reported in the server S2, said operating state then being detected immediately by the converter U, as a result of which the appropriate message is sent to the selected group of interested parties.

The e-mail client (SE) is thus always informed by the alarm server S2 when there are new alarms. The e-mail client (SE) in turn uses the converter U to search through the previously configured list of alarms (including messages) and associated interested parties, as well as the textual description, subsequently establishes a connection to the e-mail server (VE) and then sends the appropriate e-mails or SMS communications. In this case, the alarms reported by the alarm server S2 contain not only the predefined alarms, but can also contain specific alarms and other messages. Configuration is carried out for all alarms which are to be sent by e-mail and/or SMS, particularly a plurality of individual alarms and number sets, and also receivers to be informed of this notification as well as files which are to be attached by e-mail.

The e-mail's subject line can then contain the respective alarm number in addition to the actual text of the alarm and/or message in the respective language which is set. The time at which the alarm was registered can also be forwarded. If the same alarms are passed to different receivers, it is possible for the service center to be informed about all alarms and/or messages by e-mail and for the service personnel to be contacted by SMS, on a mobile phone, only about special alarms and/or messages. The alarms and/or messages can, of course, remain stored in the transmission path, particularly in the switching facility VE, i.e. the e-mail server, for a presettable time.

What is claimed is:

1. An industrial controller for at least one of a machine tool, a robot and a production machine, comprising:
    a converter which links predefined operating states, of the at least one of the machine tool, the robot and the production machine, on an individual operating-state basis to respective at least one of messages and alarms so that, if one of the predefined operating states is present, a notification about which of the predefined operating states is present is sent to a predefined distribution group, the notification including at least one of an SMS message and an e-mail; and
    a table which links each of the predefined operating states with:
        i) a respective distribution group to whom the notification is to be sent, and
        ii) information to be included in the notification,
    wherein after one of the predefined operating states is detected, the respective at least one of message and alarm linked with the one of the predefined operating states is sent via the notification to the respective distribution group linked with the detected predefined operating state, the respective at least one of message and alarm including the information linked with the detected predefined operating state, and
    wherein the table links at least two of the predefined operating states with a different respective distribution group.

2. The controller according to claim 1, wherein the e-mail has a file attached to it.

3. The controller according to claim 2, wherein the file is a trace file, the trace file including an operating sequence preceding the respective at least one of messages and alarms.

4. The controller according to claim 1, further comprising:
    an operating keyboard to effect the linking by editing.

5. The controller according to claim 1, wherein the converter is configured to initiate a bit poll, the bit poll for polling at least one system component for operation state information.

6. The controller according to claim 1, wherein the notification about the one of the predefined operating states is sent to the predefined distribution group when the one of the predefined operating states arises.

7. The controller according to claim 1, wherein each respective distribution group includes a plurality of members selected from at least one of a person and a site.

8. An industrial controller for at least one of a machine tool, a robot and a production machine, comprising:
    a converter which links predefined operating states of the at least one of the machine tool, the robot and the production machine, on an individual operating-state basis to respective at least one of messages and alarms;
    a table which links each of the predefined operating states with:
        i) a respective distribution group to whom a notification is to be sent, the notification including at least one of an SMS message and an e-mail
        ii) information to be included in the notification; and
    a transmitter configured to send the at least one of message and alarm linked with one of the predefined operating states after the one of the predefined operating states is detected, the at least one of message and alarm being sent via the notification to the respective distribution group linked with the detected predefined operating state, the respective at least one of message and alarm including the information linked with the detected predefined operating state,
    wherein the table links at least two of the predefined operating states with a different respective distribution group.

9. An industrial controller for at least one of a machine tool, a robot and a production machine, comprising:
    a converter which links predefined operating states of the at least one of the machine tool, the robot and the production machine, on an individual operating-state basis to respective at least one of messages and alarms;
    a table which links each of the predefined operating states with:
        i) a respective distribution group to whom an SMS message is to be sent, and
        ii) information to be included in the SMS message; and
    a transmitter configured to send the at least one of message and alarm linked with one of the predefined operating states after the one of the predefined operating states is detected, the at least one of message and alarm being sent via the SMS message to the respective distribution group linked with the detected predefined operating state, the respective at least one of message and alarm including the particular information identified by the information linked with the detected predefined operating state, wherein the table links at least two of the predefined operating states with a different respective distribution group.

10. An industrial controller for at least one of a machine tool, a robot and a production machine, comprising:

a converter which links predefined operating states of the at least one of the machine tool, robot the production machine, on an individual operating-state basis to respective at least one of messages and alarms;

a table which links each of the predefined operating states with a respective distribution group to whom a notification is to be sent, the notification including at least one of an SMS message and an e-mail; and a transmitter configured to send the at least one of message and alarm linked with one of the predefined operating states after the one of the predefined operating states is detected, the at least one of message and alarm being sent via the notification to respective distribution group linked with the detected predefined operating state, wherein the table links at least two of the predefined operating states with a different respective distribution group.

11. An industrial controller for at least one of a machine tool, a robot and a production machine, comprising:

a converter which links predefined operating states of the at least one of the machine tool, the robot and the production machine, on an individual operating-state basis to respective at least one of messages and alarms;

a table which links each of the predefined operating states with a respective distribution group to whom an SMS message is to be sent; and a transmitter configured to send the at least one of message and alarm linked with one of the predefined operating states after the one of the predefined operating states is detected, the at least one of message and alarm being sent via the SMS message to the respective distribution group linked with the detected predefined operating states wherein the table links at least two of the predefined operating states with a different respective distribution group.

* * * * *